United States Patent [19]

Elmer

[11] Patent Number: 4,682,679
[45] Date of Patent: Jul. 28, 1987

[54] VISCOUS DRIVE WITH VARIABLE PUMP ACTION

[75] Inventor: Arthur E. H. Elmer, Nailsworth, England

[73] Assignee: Kysor Industrial Corporation, Cadillac, Mich.

[21] Appl. No.: 835,732

[22] Filed: Mar. 3, 1986

[30] Foreign Application Priority Data

Apr. 9, 1985 [GB] United Kingdom ............... 8509041
Jun. 21, 1985 [GB] United Kingdom ............... 8515790

[51] Int. Cl.[4] .................. F16D 35/00; F16D 43/25
[52] U.S. Cl. ....................... 192/58 C; 192/82 T
[58] Field of Search ............ 192/58 C, 58 B, 82 T

[56] References Cited

U.S. PATENT DOCUMENTS

| Re. 25,481 | 11/1963 | Weir | 192/58 B |
|---|---|---|---|
| 2,838,244 | 6/1958 | Oldberg | 192/58 C X |
| 3,055,473 | 9/1962 | Oldberg et al. | 192/58 B |
| 3,101,825 | 8/1963 | Caroli et al. | 192/58 C X |
| 3,191,733 | 6/1965 | Weir | 192/58 B |
| 3,194,372 | 7/1965 | Weir | 192/58 B |
| 3,227,254 | 1/1966 | Sutaruk | 192/58 B |
| 3,236,346 | 2/1966 | Roper | 192/58 C |
| 3,250,355 | 5/1966 | Weir | 192/58 B |
| 3,262,528 | 7/1966 | Weir | 192/58 B |
| 3,263,783 | 8/1966 | Sutaruk | 192/58 B |
| 3,339,688 | 9/1967 | Harvey | 192/58 B |
| 3,339,689 | 9/1967 | Sutaruk | 192/58 B |
| 3,490,686 | 1/1970 | Weir | 192/58 B X |
| 3,757,914 | 9/1973 | Elmer | 192/85 T X |
| 4,044,729 | 8/1977 | Elmer | 192/82 T X |
| 4,269,295 | 5/1981 | Kish | 192/58 B |
| 4,298,111 | 11/1981 | Hayashi | 192/58 B |

Primary Examiner—Rodney H. Bonck
Attorney, Agent, or Firm—Price, Heneveld, Cooper, DeWitt and Litton

[57] ABSTRACT

A viscous fluid transmission including a rotary casing adapted to receve a viscous fluid and a rotary element within the casing. The casing and the rotary element are connected respectively to two drive shafts. Means is provided for pumping the fluid from its normal position in the casing into a holding reservoir or other displaced zone so as to reduce the quantity of fluid in contact with the rotary element and hence the transmitted torque. Means is also provided for varying the pumping action to modify the quantity of fluid in the casing.

6 Claims, 4 Drawing Figures

VISCOUS DRIVE WITH VARIABLE PUMP ACTION

BACKGROUND OF THE INVENTION

This invention relates to rotary transmissions or clutches of the viscous fluid type, comprising an outer rotary casing with an inner rotary element, having closely spaced surfaces between which the viscous fluid can generate torque in the well-known manner.

The invention is particularly applicable to transmissions of the kind in which it is required to reduce or disconnect the drive at intervals and the invention is particularly, though not exclusively, applicable to an automatically controlled transmission or drive between an internal combustion engine on a vehicle and an auxiliary component such as a cooling fan. In the case of cooling fans in particular it is desirable, particularly in heavy motor vehicles where the cooling fan absorbs considerable power, to be able to disconnect the drive when cooling is not needed. This can be detected, for example, by a thermal sensor in the coolant circuit, or exposed to the air stream passing through a radiator, or some other component of the engine.

There are many existing viscous fluid transmissions having means for disconnecting the drive but they tend to be complicated and expensive to produce and for various reasons their operating life is limited. It is common practice to provide a pump which continuously withdraws viscous fluid from an operating zone in which the fluid provides viscous trnsmission of torque to a reservoir where the fluid is no longer effective and the drive is interrupted. In order to control the operation of the drive it has been proposed to incorporate valves operated externally for controlling the flow of fluid towards or away from the reservoir. It has also been proposed to control the quantity of fluid in the operating zone by means of an internal displaceable wall or membrane. As stated above, however, all existing systems suffer from said disadvantages and it is an object of the invention to provide an improved transmission of this general type which will be simple to manufacture and reliable in operation.

SUMMARY OF THE INVENTION

Broadly stated, the invention consists in a viscous fluid transmission including a rotary casing and a rotary element within the casing, the casing and the rotary element being connected respectively to two drive shafts, a quantity of viscous fluid within the casing, means for pumping the fluid from its normal position in the casing into a holding reservoir or other displaced zone so as to reduce the quantity of fluid in contact with the rotary element and hence the transmitted torque, and means for varying the pumping action to modify the quantity of fluid in the casing.

Preferably the pumping means includes cooperating elements on the casing and the rotary element and the pumping action may be modified by movement of the rotary element relative to the casing in an axial direction. The pumping action may be modified automatically in response to sensed changes in the temperature of an external component or medium.

In any case, the transmission preferably includes means controlling the return of fluid to the casing and in a particular preferred construction the rotary element is shifted axially in relation to the rotary casing by a fluid operated ram having piston and cylinder elements connected respectively by rotary thrust bearings, one to the casing and the other to the rotary element, at least one of the two parts of the ram being non-rotary.

The invention may be performed in various ways and the invention will be described, by way of example, with reference to the accompanying drawings.

DETAILED DESCRIPTION OF THE PREFERRED EMBODIMENT

Figure 1:
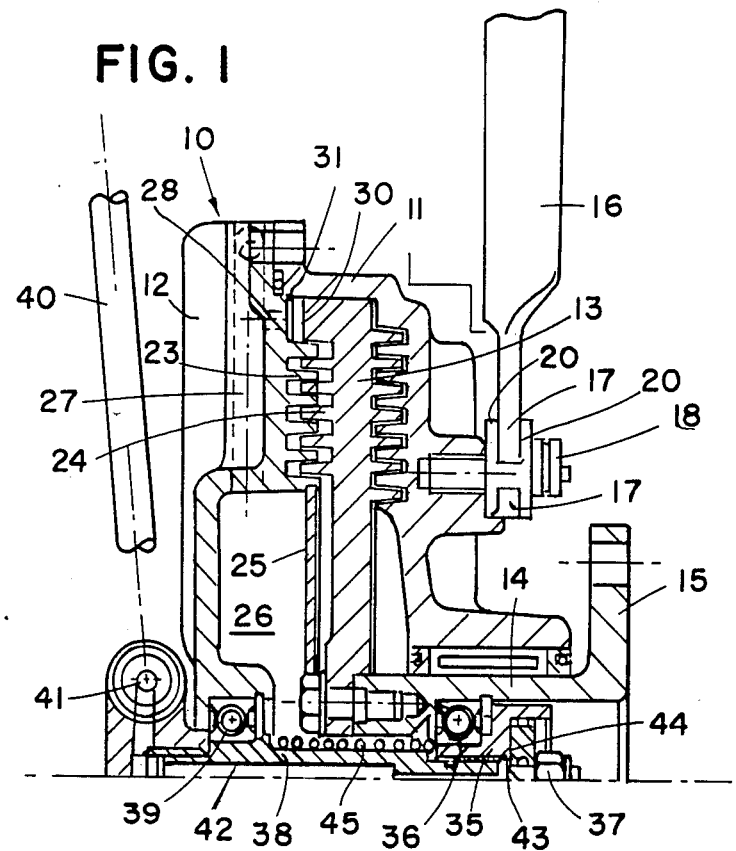
FIG. 1 is a half sectional side elevation through a rotary fluid transmission according to the invention.

The invention is applied to an automatically operated drive for a cooling fan on a vehicle engine. The unit comprises a rotary casing 10 formed from two casing members 11, 12 and an internal rotary element 13 connected to a short hollow shaft 14 having an external flange 15 by which it may be bolted to the drive flange of a shaft, not shown, driven by the vehicle engine. The fan blades 16 are attached to a ring 17 secured to the casing shell 11 by bolts 18 with intervening resilient cushioning elements 20.

Figure 2:
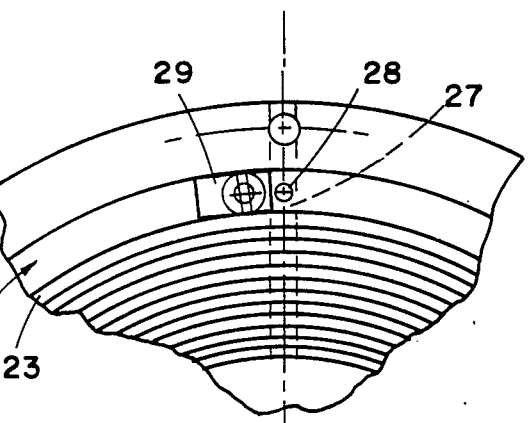
FIGS. 2 and 3 are fragmentary views of component parts.

The two casing shells 11, 12 are formed with internal annular grooves and ribs 23 and the rotary element 13 has corresponding grooves and ribs 24 which lie between and are closely spaced from the grooving and ribs 23 on the casing. Thus when a viscous fluid is present in the casing, a considerable torsional drag or drive exists between the two parts. To control the quantity of fluid in this labyrinth zone, an annular wall 25 is provided within the casing defining an annular reservoir 26 and a radial passage 27 leads inwards to this reservoir from a pumping port 28 which cooperates with a scoop 29 (FIG. 2) in this outer annular face of the casing. The adjacent annular face 30 of the internal rotary element 13 creates a rotational movement of the fluid between the two parts and thus causes pumping action driving the fluid radially inwards. The effectiveness of the pumping action can be varied by altering the distance or displacement between the two faces 30, 31 and in this example, the control is effected by bodily axial movement of the whole rotary element 13 relative to the casing.

In this particular example, the internal element with the shaft 14 and flange 15 are held fixed axially and the whole casing is moved. An internal pneumatically operated ram includes a ram cylinder 35 connected via a thrust bearing 36 to the shaft 14 and thus held fixed axially. An annular piston 37 is connected by an internal hollow spindle 38 and another thrust bearing 39 to the forward casing part 12. Compressed air to operate the ram is admitted via a flexible pressure tube 40 and a coupling 41 to an internal passage 42 within the spindle 38, this communicating via port 43 with the annular space 44 between the piston and cylinder.

Compressed air is automatically admitted to the pressure hose 40 under the control of a thermostat sensing the temperature of the coolant for the engine. When the coolant temperature rises, the supply of compressed air is shut off by a valve (not shown) and a compression spring 45 acts in an axial direction urging the casing 12 bodily to the left in FIG. 1 so as to cause axial separation between the surfaces 30, 31 and thus destroy the pumping action. Accordingly, fluid is retained in the whole labyrinth zone and the maximum viscous drive is obtained hence causing the maximum cooling effect of the fan blade 16. When the sensed coolant temperature falls, the thermostat opens the air valve admitting compressed air to the hose 40 from which it is transmitted to the front face of the piston 37 generating an axial force which overcomes the spring 45 and causes the casing to move bodily to the right thus closing the clearance between the pumping faces 30 and 31. The resultant pumping action drives the fluid radially inwards along the passage 27 into the reservoir 26 where it is retained and the depletion of fluid in the labyrinth pumping zone causes the drive to be interrupted. Thus, without any internal delicate valve mechanisms and without any rotary seals, other than normal bearing seals, the invention provides a simple, reliable control of the pumping action to vary the quantity of fluid in the operating zone of the drive unit.

Figure 3:
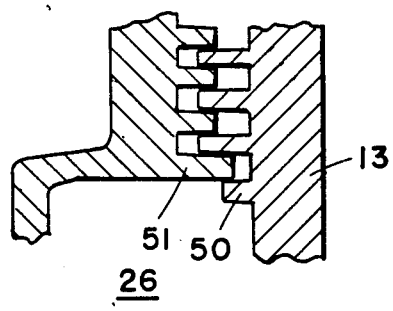

In a modification, there may be added a simple self-contained means of controlling also the return flow of fluid from the reservoir to the pumping zone. Thus, as shown in FIG. 3, the rotary element 13 may be provided with an additional ring 50 in close contact with the innermost ring 51 on the casing, and acting as a valve such that when the element 13 moves to the right the ring 50 opens a small gap and allows fluid to flow back to the pumping zone. This again is provided without any other internal moving parts.

The unit, as described, may be designed for a positive on/off operation, the internal element 13 having just two possible positions. Alternatively, however, the ram cylinder 35 and annular piston 37 may be arranged to control or adjust the axial position of the rotary element 13 so as to provide either continuous variation or stepping positioning so as to modify or modulate the pumping effect and hence to modulate the quantity of fluid in the labyrinth, which in turn provides modulation of the speed of the fan.

In place of the ram 35 and piston 37 as illustrated, other operating systems may be employed, for example, an electric solenoid, or a mechanical linkage, or a mechanical connection to a remote fluid actuator.

In the unit illustrated the control is derived from a remote thermal sensor, not illustrated, positioned in the liquid coolant circuit of the engine. Other thermal controls may be used such as an air sensing unit, for example in a form of a bi-metal strip positioned in the air stream flowing over the fan blades 16. This bi-metal element may be located, for example, at the left-hand front end of the unit centrally on the rotary axis and arranged to operate a small pneumatic control valve which admits compressed air to the ram 35 and piston 37. The air sensing unit may be used as an alternative or an addition to the liquid coolant sensor as described.

ALTERNATE EMBODIMENT OF THE INVENTION

Figure 4:
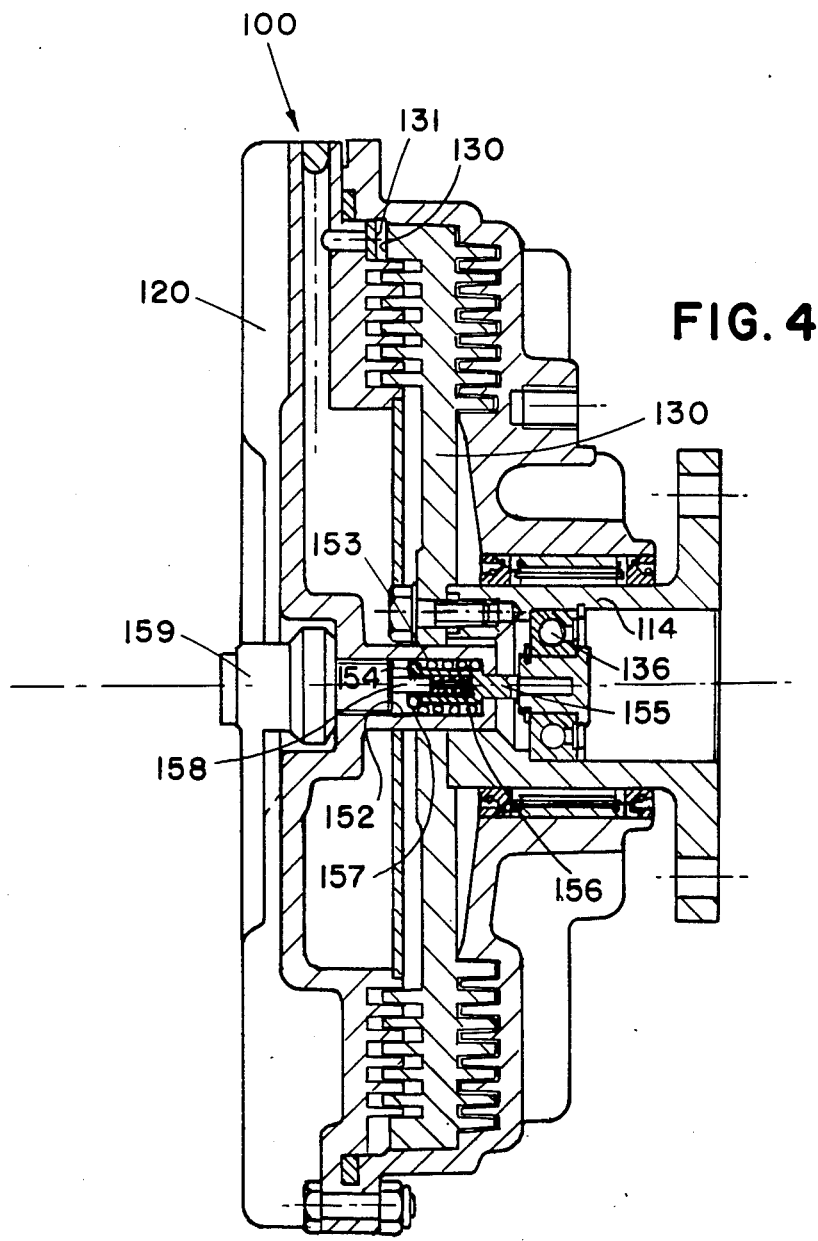
FIG. 4 is an alternative embodiment of the invention.

In an alternative arrangement of the invention as illustrated in FIG. 4, the variation in drive can be achieved automatically as a result of the change in temperature of a wax capsule which acts between axially movable parts of the drive comprising an external rotary casing and an internal rotary element.

In the modified embodiment shown in FIG. 4, the rotary casing 100 includes a casing member or shell 120 formed with a central cavity 152 housing a compression spring 153 which reacts against an annular flange 154 on the end of a spindle 155 mounted with the shaft 114 via the thrust bearing 136. The spring 153, therefore, normally acts to cause the casing 100 to be biased to the right to close the clearance between the faces 130 and 131 with the resulting interruption of the drive. However, when the temperature within the unit rises, a wax capsule 156 within a cavity 157 in the spindle 155 expands and drives out a piston 158 on a plug 159 secured within the shell 120, thus overcoming the bias of the spring 153 and causing the casing 100 to move bodily to the left. This opens the clearance between the pumping faces 130 and 131 to reduce or destroy the pumping action so that the viscous drive between the casing 100 and the rotary element 130 is restored.

Of course other temperature responsive devices capable of overcoming the bias of the spring 153 could be used in place of the wax capsule 156.

The embodiments of the invention in which an exclusive property or privilege is claimed are defined as follows:

1. A viscous fluid transmission including a rotary casing and a rotary element within the casing, the casing and the rotary element being connected respectively to two drive shafts, a quantity of viscous fluid within the casing, means for pumping the fluid from its normal position in the casing into a holding reservoir or other displaced zone so as to reduce the quantity of fluid in contact with the rotary element and hence the transmitted torque, means for varying the pumping action to modify the quantity of fluid in the casing; said pumping means including cooperating elements on the casing and the rotary element, said pumping means being modified by movement of the rotary element relative to the casing in an axial direction.

2. A fluid transmission according to claim 1 in which the pumping action is modified automatically in response to sensed changes in the temperature of an external component or medium.

3. A fluid transmission according to claim 1 including means controlling the return of fluid to the casing.

4. A fluid transmission according to claim 1 in which the rotary element is shifted axially in relation to the rotary casing for varying the pumping action, by a fluid operated ram having piston and cylinder elements connected respectively by rotary thrust bearings, one to the casing and the other to the rotary element, at least one of the two parts of the ram being non-rotary.

5. A viscous fluid transmission including a rotary casing and a rotary element within the casing, the casing and the rotary element being connected respectively to two drive shafts, a quantity of viscous fluid within the casing, means for pumping the fluid from its normal position in the casing into a holding reservoir or other displaced zone so as to reduce the quantity of fluid in contact with the rotary element and hence the transmitted torque, means for varying the pumping action to modify the quantity of fluid in the casing, said rotary element being shifted axially in relation to the rotary casing for varying the pumping action, by a fluid operated ram having piston and cylinder elements connected respectively by rotary thrust bearings, one to the casing and the other to the rotary element, at least one of the two parts of the ram being non-rotary.

6. A viscous fluid transmission including a rotary casing and a rotary element within the casing, the casing and the rotary element being connected respectively to two drive shafts, a quantity of viscous fluid within the casing, means for pumping the fluid from its normal position in the casing into a holding reservoir or other displaced zone so as to reduce the quantity of fluid in contact with the rotary element and hence the transmitted torque, means for varing the pumping action to modify the quantity of fluid in the casing, said pumping means including cooperating elements on the casing and the rotary element; said pumping action being varied to modify the quantity of fluid in said casing by shifting said rotary element relative to said rotary casing.

* * * * *